United States Patent Office.

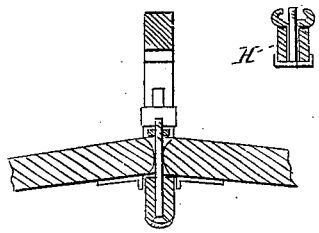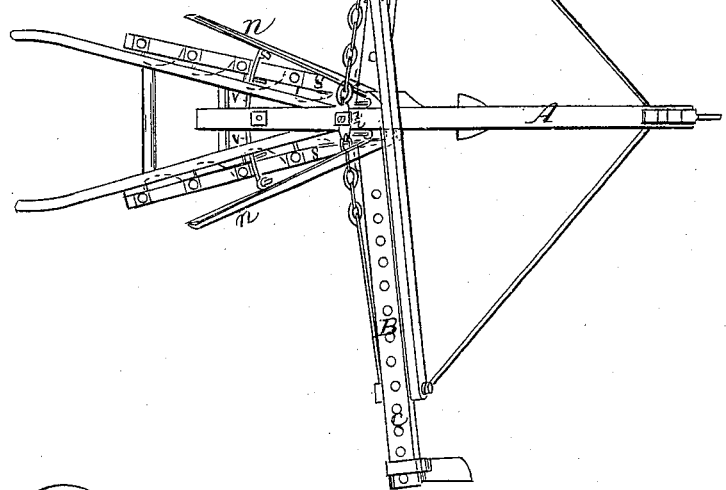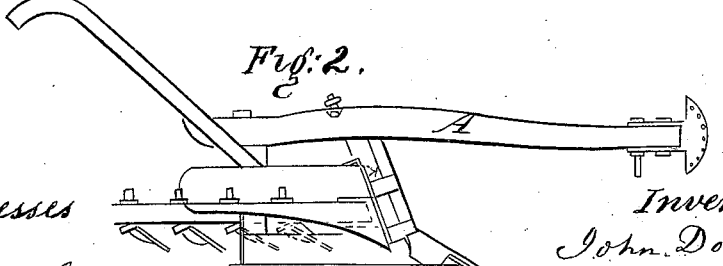

JOHN DOOLEY, OF ST. PAUL, MINNESOTA.

Letters Patent No. 92,590, dated July 13, 1869.

IMPROVEMENT IN COMBINED PLOW, CULTIVATOR, AND MARKER.

The Schedule referred to in these Letters Patent and making part of the same.

*To all whom it may concern:*

Be it known that I, JOHN DOOLEY, of St. Paul, in the county of Ramsey, and State of Minnesota, have invented a new and valuable Improvement in Combined Plow, Cultivator, and Marker; and I do hereby declare that the following is a full, clear, and exact description of the construction and operation of the same, reference being had to the annexed drawings, making a part of this specification, and to the letters and figures of reference marked thereon.

Figure 1, of the drawings, is a top-plan view of my device.

Figure 2 is a longitudinal sectional view of the same.

Figure 3 are details.

My invention relates to agricultural implements; and

It consists, mainly, in constructing and arranging, in a novel manner, devices susceptible of use either as a plow, cultivator, or marker of rows, to be planted adjustable, at will.

The letter A, of the drawings, represents a plow-beam, and the letter B, a marker arranged thereon, as shown.

This marker is constructed in sections, the section $a$ being pivoted to the section $c$, and arranged for folding inward at will, as represented on fig. 1.

The method of attaching the sections $b$ to the plow-beam is shown on fig. 3.

My object in constructing the marker in sections, the outer ones of which may be folded on the inner, is to enable the operator to make either two or four rows at the same time, as he may desire.

To each side of the front standard of the plow, I affix bands, with suitable openings or staples therein, through which I pass pins, as shown at $i$ on fig. 1.

The office of these staples and pins is to provide means for attaching either cultivators or double plow-shares, as the operator may see fit.

The black lines, marked $n$ on fig. 1, represent double plowshares, adjusted to said pins by the pins $i$, that pass through staples at the front ends thereof, and the red lines on said figure represent cultivators adjusted to the same pin by the same or similar means, after the plowshares are removed. These cultivators are marked $s$.

I make a slot in the rear standard of the plow, and place therein an adjustable nut and screw. I also construct small perforated rods, one end of which are hinged respectively to the inside of one of the cultivators or plowshares, as the case may be, and the other placed under the rear nut of the adjustable screw, the screw passing through one of the perforations therein.

This device enables me to raise, lower, or adjust, at a greater or lesser distance from each other, as I may desire, either the plowshares or the cultivator.

The nut and screw aforesaid are shown at H on fig. 3. The perforated bar is marked $v$.

The red lines on fig. 2 represent the form in which my cultivators are constructed.

The arrangement herein described enables the operator to change the implement from a plow to a cultivator, and *vice versa*. It also enables him to use or dispense with the marker, as he may desire, and mark either two or four rows therewith. Finally, it enables him to plow or cultivate at any desirable depth, and operate the plowshares or cultivators at any desirable distance apart from each other.

What I claim as my invention, and desire to secure by Letters Patent, is—

1. An adjustable plow, cultivator, and marker, having cultivators $s$, plowshare $n$, and marker B, constructed and arranged substantially as and for the purposes specified.

2. In combination with an adjustable plow and cultivator, nut and screw H, when working in the slotted standard, as described, and the perforated rods $v$, arranged and operating substantially as and for the purposes specified.

In testimony that I claim the above, I have hereunto subscribed my name, in the presence of two witnesses.

JOHN DOOLEY.

Witnesses:
W. H. GRANT,
DANA WHITE.